US008597411B2

(12) United States Patent
Shahin et al.

(10) Patent No.: US 8,597,411 B2
(45) Date of Patent: Dec. 3, 2013

(54) SORBENTS FOR THE RECOVERY AND STRIPPING OF ACID GASES

(75) Inventors: Ahmed M. Shahin, Calgary (CA); Conrad Ayasse, Airdrie (CA)

(73) Assignee: Archon Technologies Ltd., Calgary, Alberta (CA)

( * ) Notice: Subject to any disclaimer, the term of this patent is extended or adjusted under 35 U.S.C. 154(b) by 134 days.

(21) Appl. No.: 13/399,911

(22) Filed: Feb. 17, 2012

(65) Prior Publication Data
US 2013/0213229 A1     Aug. 22, 2013

(51) Int. Cl.
*B01D 53/02*     (2006.01)
*B01J 20/26*     (2006.01)

(52) U.S. Cl.
USPC ............... 95/139; 96/154; 423/228; 423/230; 502/402

(58) Field of Classification Search
USPC ............ 95/90, 107, 108, 129, 136, 137, 139, 95/900; 96/108, 154; 423/220, 228–230; 208/208 R; 502/400, 402
See application file for complete search history.

(56) References Cited

U.S. PATENT DOCUMENTS

| 3,646,594 | A | * | 2/1972 | Lasky et al. ..................... 95/106 |
| 5,376,614 | A | * | 12/1994 | Birbara et al. ................. 502/402 |
| 5,492,683 | A | | 2/1996 | Bibara et al. |
| 5,876,488 | A | | 3/1999 | Bibara et al. |
| 2007/0148069 | A1 | * | 6/2007 | Chakravarti et al. .......... 423/220 |
| 2012/0076711 | A1 | * | 3/2012 | Gebald et al. ................. 423/228 |
| 2012/0164043 | A1 | * | 6/2012 | Peiffer et al. ................. 423/228 |
| 2012/0164044 | A1 | * | 6/2012 | Peiffer et al. ................. 423/228 |
| 2012/0164045 | A1 | * | 6/2012 | Peiffer et al. ................. 423/228 |
| 2012/0216676 | A1 | * | 8/2012 | Addiego et al. ................. 95/139 |

FOREIGN PATENT DOCUMENTS

| WO | WO2008/021700 | 2/2008 |
| WO | WO2010/091831 | 8/2010 |

* cited by examiner

*Primary Examiner* — Frank Lawrence, Jr.
(74) *Attorney, Agent, or Firm* — D. Doak Horne; Gowling Lafleur Henderson LLP

(57) ABSTRACT

An acid-gas sorbent comprising an amine-composite. The present composite may comprise a first component comprising an amine compound at a concentration of from about 1 wt % to about 75 wt %; a second component comprising a hydrophilic polymer and/or a pre-polymer compound at a concentration of from about 1 wt % to about 30 wt %; and a third component comprising a cross-linking agent, and/or a coupling agent at a concentration of from about 0.01 wt % to about 30 wt %.

42 Claims, 7 Drawing Sheets

SORBENTS FOR THE RECOVERY AND STRIPPING OF ACID GASES

FIELD OF THE INVENTION

The present invention relates generally to active amine composite sorbents for capturing acidic gases from, for example, a fluid stream, and more particularly to sorbents, processes, methods, systems, uses, apparatus, and the like for the adsorption and/or absorption of such acid gases from such a fluid stream.

BACKGROUND OF THE INVENTION

The combustion of fuels containing hydrogen and carbon, such as coal and natural gas, produces significant volumes of gaseous exhaust waste streams that contain one or more undesirable gaseous compounds such as one or more of the acid gases. Acid gases such as carbon dioxide ($CO_2$), sulfur gases (e.g. $SO_2$, $H_2S$), and oxides of nitrogen ($NO_x$), can cause significant environmental pollution and health risks. There has been increasing concern about the damage caused by these contaminants, which has led to an increased demand to reduce their emission, including $CO_2$.

Separation of acid gases, such as $CO_2$ and $H_2S$ from gas streams can be achieved via chemical absorption or chemical/physical absorption processes. The most widely used process for $CO_2$ separation and capture from acid gas-containing streams is the chemical absorption process utilizing liquid amine solutions. Aqueous solutions of monoethanolamine (MEA) or diethanolamine (DEA) are commonly used in the wet chemical absorption and low-pressure stripping of $CO_2$. In this process, the $CO_2$ reacts with the liquid amine solution to form a carbamate species. Upon heating, the carbamate species decomposes to release the absorbed $CO_2$ and regenerate the amine solution. This process can be costly and energy intensive. For example, the liquid amine solution has a limited life time due to its degradation through oxidation. Furthermore, the high corrosivity of the utilized amine makes it difficult to use high concentrations of the amine solutions. Typically, only 10-30 wt % solutions of MEA are employed to capture $CO_2$ from the acid gas containing streams, which necessitates the heating and cooling of large volumes of water.

Acid gas capture technology utilizing solid sorbents has increasingly received attention due to its potential for reducing corrosion, energy cost and mass/heat transfer. Such technology uses a porous solid sorbent to reversibly adsorb the $CO_2$ and/or $H_2S$ from the acid gas containing streams.

Synthetic zeolite A and X types can be effective adsorbents for $CO_2$. U.S. Pat. No. 3,981,698 to Leppard, U.S. Pat. No. 4,039,620 to Netteland, U.S. Pat. No. 4,711,645 to Kumar, U.S. Pat. No. 4,986,835 to Uno, and U.S. Pat. No. 5,156,657 to Ravi describe the use of 5A, 10A and 13X as $CO_2$ sorbents. In these processes, the molecular sieves physically adsorb the $CO_2$ and are regenerable at ambient temperature and pressure. However, at ambient temperature, desorption cycles are too short to desorb all adsorbed $CO_2$. Consequently, some of the adsorbed $CO_2$ remains on the molecular sieve, which reduces its capacity.

In alternative embodiments of the solid sorbents, amino-containing moieties have been impregnated or grafted onto the surface of the solid supports. For instance, WO 2004/054708 describes the use of a water-tolerant sorbent containing grafted amine on a silica support. U.S. Pat. App. Publ. No 2007/0149398 to Jones et al discloses a method of preparing a $CO_2$ solid sorbent containing a hyperbranched amine polymer covalently bonded to at least one surface oxygen. At atmospheric pressure, the average $CO_2$ capacity was said to be 4.4 mmol ($CO_2$)/g sorbent, or 0.1936 g CO2/g sorbent.

Liquid oxygenated amines, such as diisopropanolamine, have been used in removing $CO_2$ from acid gas containing streams. U.S. Pat. No. 4,044,100 describes the use of liquid mixtures of diisopropanolamine and polyethylene glycol in acid gas removal from gaseous streams. The use of the oxygenated compounds, such as polyols, glycols and ethers in $CO_2$ absorption/desorption cycles of solid sorbents has been examined and used in the space shuttle $CO_2$ removal system.

In U.S. Pat. Nos. 6,364,938; 5,876,488; 5,492,683 and 5,376,614 describe a solid sorbent containing a high surface area solid polymer support and polyethyleneimine/polyethylene glycol. The concentration of both the polyethylenimine and polyol utilized was from 1 wt % to 25 wt % of the total weight of the absorbent. Hicks et al, Journal of American Chemical Society 130:2902 (2008), described a method for impregnating a mesoporous silica support with different amounts of polyethyleneimine. However, the resulting material was very sticky due the addition of the polyethyleneimine to the internal and external surface of the silica support. In addition, a significant pressure drop was observed because of the clogging in the absorbing column. Therefore, the $CO_2$ capacity could not be determined.

U.S. Pat. No. 7,795,175 to Olah describes a process for $CO_2$ absorption using solid nano-particles of a silica support, polyethylenimine and polyol. The concentration of the utilized polyethylenimine was 25 wt % to 75 wt % from the total weight of the sorbent and polyol was in an amount up to 25 wt % of the total weight of the absorbent. The $CO_2$ capacity was 0.117 g ($CO_2$)/g of absorbent. Nevertheless, the small particle size of the sorbent makes it difficult to conduct the absorption/desorption cycles at high pressure due to the pressure drop in the absorption column.

As noted above, the prior art sorbents and methods have one or more undesirable characteristics.

SUMMARY OF THE INVENTION

As used herein, the term 'acid gas' refers to gases that form acidic solutions when mixed with water.

As used herein, "a" or "an" means "at least one" or "one or more".

The present disclosure provides a novel acid-gas sorbent comprising a particular amine-composite which may be directly introduced in a fluid stream to adsorb acid gases such as $CO_2$ or $H_2S$ therefrom, or may optionally be impregnated on a porous support through which such fluid may be passed to thereby "strip" such acid gases from within said fluid.

The amine-composite of the present invention may be formed as an adduct, from a first component comprising an amine compound at a concentration of from about 1 wt % to about 75 wt % of the final composite; a second component comprising a hydrophilic polymer and/or a pre-polymer compound at a concentration of from about 1 wt % to about 30 wt % of the final composite; and a third component comprising a carboxylic acid, a cross-linking agent, and/or a coupling agent at a concentration of from about 0.01 wt % to about 30 wt % of the final composite.

The present disclosure further provides methods of the present amine-composite sorbents, uses of such sorbents, and processes of absorbing/adsorbing acid gases from a fluid stream.

Accordingly, in a broad embodiment of the present invention, such invention comprises an acid-gas sorbent comprising an amine composite, said composite comprising:

(i) a first component comprising an amine compound at a concentration of from about 1 wt % to about 75 wt % of the final composite;

(ii) a second component comprising a hydrophilic polymer and/or a pre-polymer compound at a concentration of from about 1 wt % to about 30 wt % of the final composite; and (iii) a third component which serves as a coupling, crosslinking or catalyzing agent to induce a reaction between the first and second components, at a concentration of from about 0.01 wt % to about 30 wt % of the final composite.

The amine is preferably a primary, secondary, or tertiary alkylamine, aromatic amine, polyamine, or a combination thereof.

In a preferred embodiment, the second component becomes chemically bonded to the first component.

In a greatly preferred embodiment, the adduct is formed within, situated on, impregnated in, or uniformly applied and dispersed within, a solid porous support. Such solid porous support preferably comprises silica, alumina, silica-alumina, zeolite, carbon, precipitated oxides, ceria, titania, or a combination thereof.

Use of an acid-gas sorbent according as per any of the above compositions for the absorption and/or adsorption of an acid gas also forms part of the invention.

In a further embodiment, the present invention comprises a method of preparing an acid-gas sorbent, comprising the steps of combining:

(i) a first component comprising an amine compound at a concentration of from about 1 wt % to about 75 wt % of the final composite;

(ii) a second component comprising a hydrophilic polymer and/or a pre-polymer compound at a concentration of from about 1 wt % to about 30 wt % of the final composite; and (iii) a third component which serves as a coupling, crosslinking or catalyzing agent to induce a reaction between the first and second components, at a concentration of from about 0.01 wt % to about 30 wt % of the final composite.

The present invention further comprises a method of removing an acid gas from a fluid stream containing the acid gas, the method comprising:

a. providing an incoming fluid stream comprising the acid gas; and b. bringing the fluid stream into contact with a sorbent as described above, with or without a porous solid support, under conditions suitable for absorption and/or adsorption of the acid gas by the sorbent;

wherein the fluid stream comprises a lesser amount of the acid gas after contacting the sorbent.

In a further refinement of the above method, the invention comprises a method of removing an acid gas from a fluid stream containing the acid gas, the method comprising:

a. providing an incoming fluid stream comprising the acid gas;

b. exposing an adduct formed from the combination of:

i) a first component comprising an amine compound at a concentration of from about 1 wt % to about 75 wt % of the final composite;

(ii) a second component comprising a hydrophilic polymer and/or a pre-polymer compound at a concentration of from about 1 wt % to about 30 wt % of the final composite; and (iii) a third component which serves as a coupling, crosslinking or catalyzing agent to induce a reaction between the first and second components, at a concentration of from about 0.01 wt % to about 30 wt % of the final composite;

to said incoming fluid stream, under conditions suitable for absorption and/or adsorption of the acid gas by the adduct, so as to substantially or at least partially remove such acid gas from said fluid stream.

Thereafter, the acid gas may be de-adsorbed from the adduct by exposing the adduct to higher or lower temperatures or pressures.

Specifically, in a further refinement of the above method, where the fluid stream is a hydrocarbon-containing fluid stream recovered from an underground formation containing the acid gas carbon dioxide, and wherein it is desired to recover such carbon dioxide from such fluid stream and re-inject said carbon dioxide into said underground formation in a closed loop recovery system in respect of such carbon dioxide, such method further comprises the subsequent step, after step b) of:

c) exposing said adduct to a pressurized and heated stream of carbon dioxide, to force carbon dioxide within said adduct to be released into said pressurized and heated stream.

Such carbon dioxide recovered (ie stripped) from the fluid stream can then be re-injected downhole into the underground hydrocarbon-containing formation, thereby creating a closed-loop system for the injection and recovery of carbon dioxide during oil recovery from the underground formation.

The second component used in the above method of the present invention may comprise a polyol, and said third component comprise a cross-linking agent.

The method contemplates that the so-formed adduct may be dispersed directly in said fluid stream, including, in the case of a gaseous stream, spraying such adduct in the form of small droplets, into said acid gas stream. Alternatively, water may first be added to said adduct prior to dispersing said adduct and said water into the incoming fluid stream.

In an alternative embodiment of the above method, the adduct may be provided on, or formed within, pores of a solid porous support member, and the fluid stream passed through said solid porous support.

In a still further embodiment of the above method, the second component is a polyol dissolved in a solvent which does not react with the amine composite, and the adduct is provided in solution into pores within a solid porous support, and the solvent allowed to evaporate leaving the adduct in the form of a thin residual film surrounding or within the pores of the solid porous support. Thereafter the fluid stream is passed through the solid support under conditions suitable for absorption and/or adsorption of the acid gas by the adduct, to thereby strip the acid gas, such as $CO_2$ and/or $H_2S$, from the fluid stream.

This summary does not necessarily describe the entire scope of the present invention. Other aspects, features and advantages of the invention will be apparent to those of ordinary skill in the art upon review of the following description of specific embodiments of the invention.

DETAILED DESCRIPTION OF PREFERRED EMBODIMENTS

Figure 1:
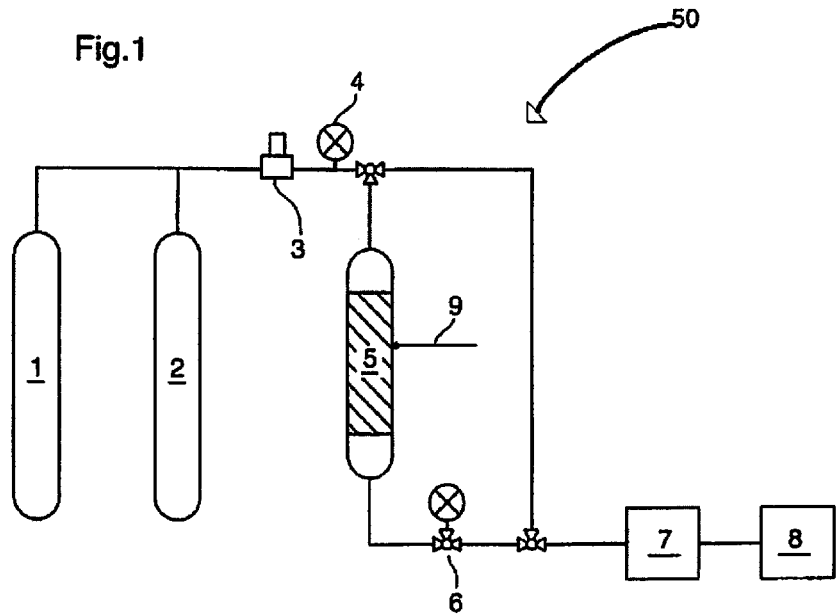
FIG. 1 is a schematic graph of the a carbon dioxide absorption process.

Use of examples in the specification, including examples of terms, is for illustrative purposes only and is not intended to limit the scope and meaning of the embodiments of the invention set out and described in the disclosure. Numeric ranges are inclusive of the numbers defining the range. In the specification, the word "comprising" is used as an open-ended term, substantially equivalent to the phrase "including, but not limited to," and the word "comprises" has a corresponding meaning.

The present invention provides active amine composite sorbents for capturing acidic gases. Acid gases may be absorbed and/or adsorbed by the sorbent and may be desorbed at preferably elevated pressure and/or temperature. For example, the desorption may occur when the acid gases are compressed for pipelining or deep well disposal thus providing an energy consumption advantage. The present sorbents may be employed in any suitable form such as in the liquid state or in a solid supported form.

Acidic gases can be captured from any suitable source. These may include small gas emissions or even large-scale processes, such as flue gas streams from oilfield in-situ combustion processes, power plants, coal or oil gasifiers and natural gas, as well as gas streams from hydrogen and ammonia production facilities.

In certain embodiments, the present absorbents allow for the absorption of acidic gases, including but not limited to $CO_2$ and $H_2S$ gases, at capacities equivalent to or higher than those obtained using liquid amine systems.

Polyols that are chemically reactive toward amines can be used in combination with amines to provide an absorbent of higher acid gas absorption capacity. The present adsorbates comprise reactive adducts of amines, polyols and crosslinkers and the adducts may be deposited within porous solids which can provide structural integrity and a substrate means of uniformly exposing a gas stream to the amine composite. Active groups (such as primary, secondary, and tertiary amines, hydroxyl groups) are at least partially located inside the pores and/or pore channels of the solid substrate/support. The solid support may also provide a higher surface area for the gas/amine contact. For example, the present support may have a surface area ranging from 50-500 m$^2$/g, and potentially up to 2000 m2/g. The pore size of the solid support is preferably large enough to enable loading of adsorption active sites and to allow passage of $CO_2$, $H_2S$, or other acidic components. Exemplary solid porous supports include, but are not limited to, polymeric supports, alumina, carbon, molecular sieves, carbon nanotubes, nanosilica, organosilica, and mesoporous silica.

Any suitable amine may be used in manufacturing the present sorbents. Amines include, but are not limited to, primary, secondary, tertiary alkyl and alkanoamines, aromatic amines, polyamines, mixed amines, and suitable combinations thereof. It is preferred that the sorbent comprise primary, secondary and/or tertiary amines. These amines show good activity toward acidic gas absorption. Preferred amines include those with high nitrogen/carbon ratios. Such amines can provide a high density of active functional groups relative to molecular weight, and a high concentration of amine groups loaded on the support. Generally, in acidic gas separation processes the amine/amines utilized should have high absorption capacity, high regeneration ability, low volatility, and high thermal and oxidation stability.

Amines for use herein may be selected from, but are not limited to, monoethanolamine (MEA), diethanolamine (DEA), methyldiethanolamine (MDEA), triethanolamine, tetraethylenepentaamine, polyethyleneimine, cyclic amines, and suitable derivative/combinations thereof. Polymeric amines, such as polyethyleneimines (PEI) may be useful because of their thermal stability, low volatility, high N/C ratio and high number of primary, secondary and tertiary amine groups. Polyethyleneimines of molecular weight greater than 600 are preferred.

Any suitable concentration of amine may be used in the present sorbent. For example, the amine concentration may be from about 1 wt % to about 75 wt % of the finished sorbent.

The present sorbent may comprise one or more polyols. Any suitable polyol may be used including, but not limited to, ethylene glycol, polyethylene glycol, polyvinyl alcohol, and combinations thereof. Preferred polyols for use herein have low volatility, high thermal stability, and/or are chemically reactive toward amine groups. Polyols of any suitable molecular weight may be used such as about 1,000 AMU to 100,000 AMU. While not wishing to be bound by theory it is believed that the incorporation of the polyols in the pores and pore channels of the solid porous member improves the acid gas physical adsorption on the sorbent by increasing the volume of gas exposed to said amine composite, but may also enhance the sorbent thermal stability. Moreover, it is believed that coupling of the amines and hydrophilic polymer improves their polymer/support cohesive properties and reduces volatility. This can lead to high acidic gas absorption capacity over a range of temperatures and pressures such as for example, from 20° C. or lower to 100° C. and atmospheric to 1500 psig. Enhanced thermal stability of a sorbent will allow for multiple absorption/desorption cycles with minimal loss of capacity.

The present sorbent may be prepared in any suitable manner. Various synthetic methods are known. Once prepared the sorbent may be examined for its thermal stability and acidic gas absorption capacity.

The present sorbent may be an active amine composite comprising a first component, a second component, and a third component.

The first component may include, but is not limited to, alkylamines, such as monoethanolamine (MEA), diethanolamine (DEA), diisopropylamine (DIP); arylamine; alkylarylamine, cyclicamine, amine-containing polymers such as, polyethyleneimine, polydiethyl aminoethyl methacrylate, amine grafted poly vinyl alcohol, amine-grafted polyethylene glycol, amine-grafted sugar, amine-grafted polyesters, hyperbranched polyamine-grafted polyol, or combinations thereof. The amount of active absorption amine in the composite may range from about 1 wt % to about 75 wt %, preferably from about 10 wt % to about 40 wt %.

The second component may comprise a hydrophilic component that reacts with the amine groups in the first component. The hydrophilic component may include, but is not limited to, carbohydrates (e.g. sugar), ethylene glycol, polyethylene glycol, polyvinyl ester, polyvinyl alcohol, or combinations thereof. The amount of second component in the present composite may range from about 1 wt % to about 75 wt %, preferably from about 20 wt % to about 40 wt %, more preferably from about 5 wt % to about 20 wt %, and most preferably from about 1 wt % to about 5 wt.

Figure 8:
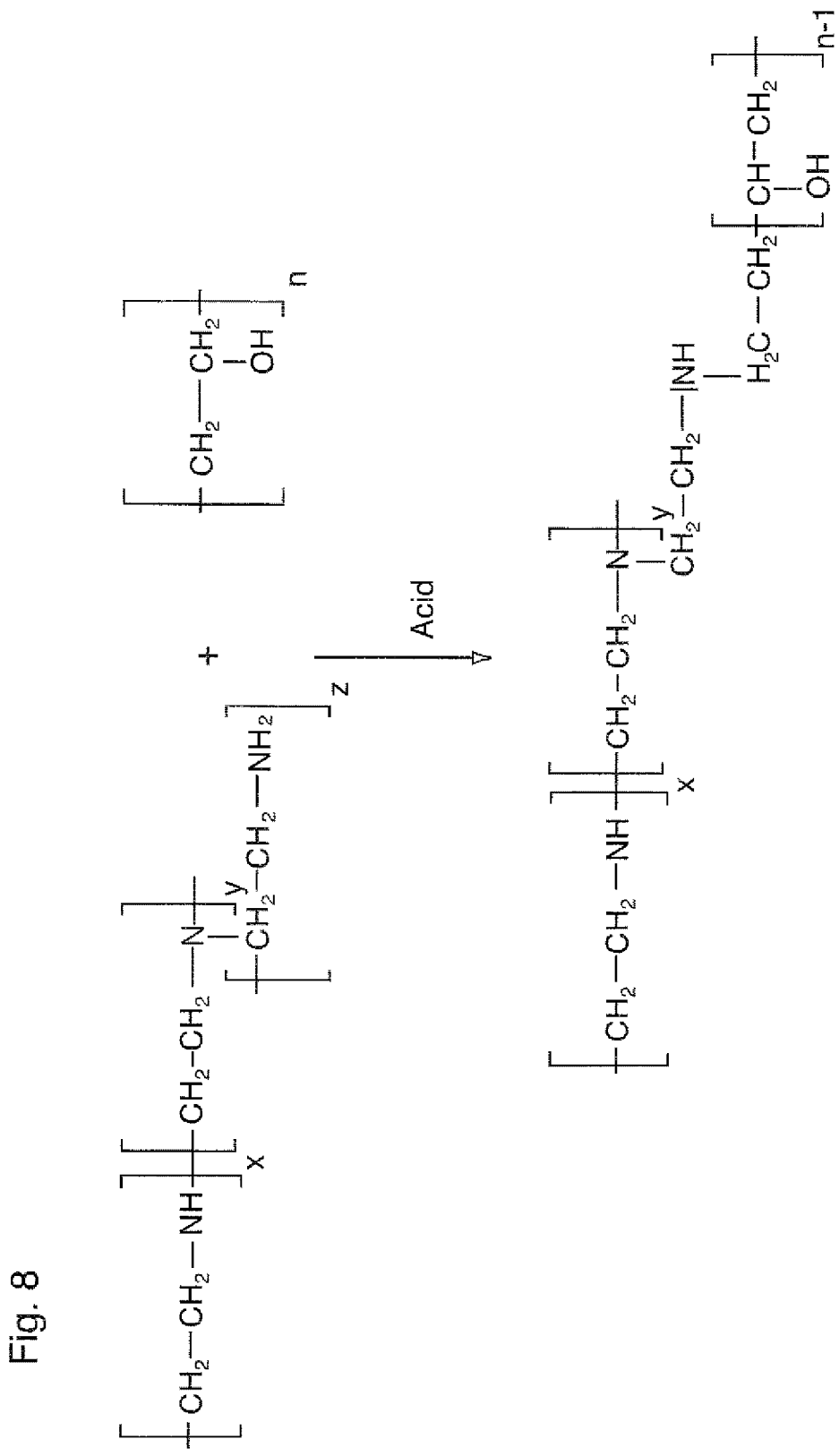
FIG. 8 shows the reaction of PEI with PVA in the presence of acetic acid.
Figure 9:
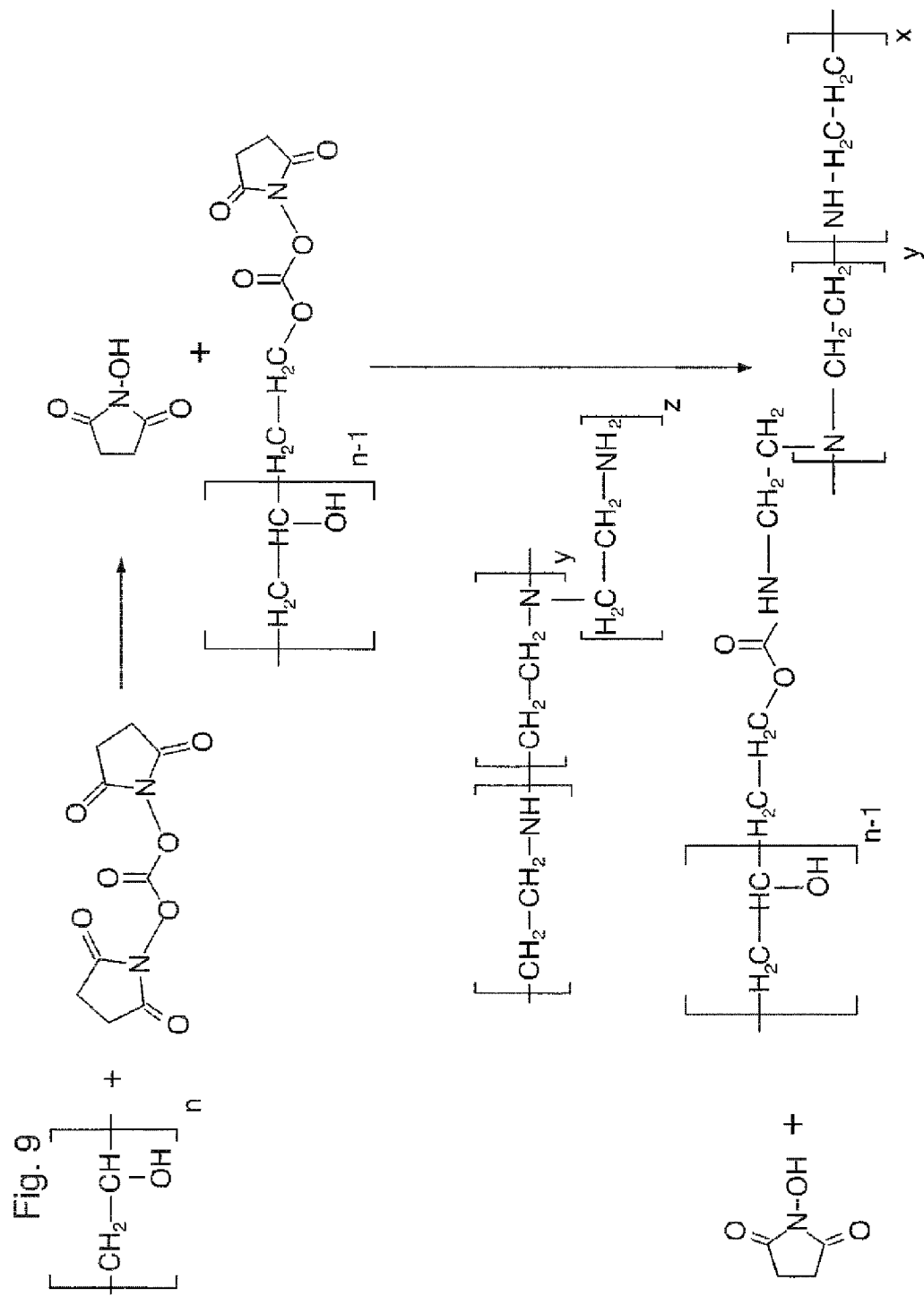
FIG. 9 shows the coupling of PVA with PEI using disuccinimidyl carbonate.
Figure 10:
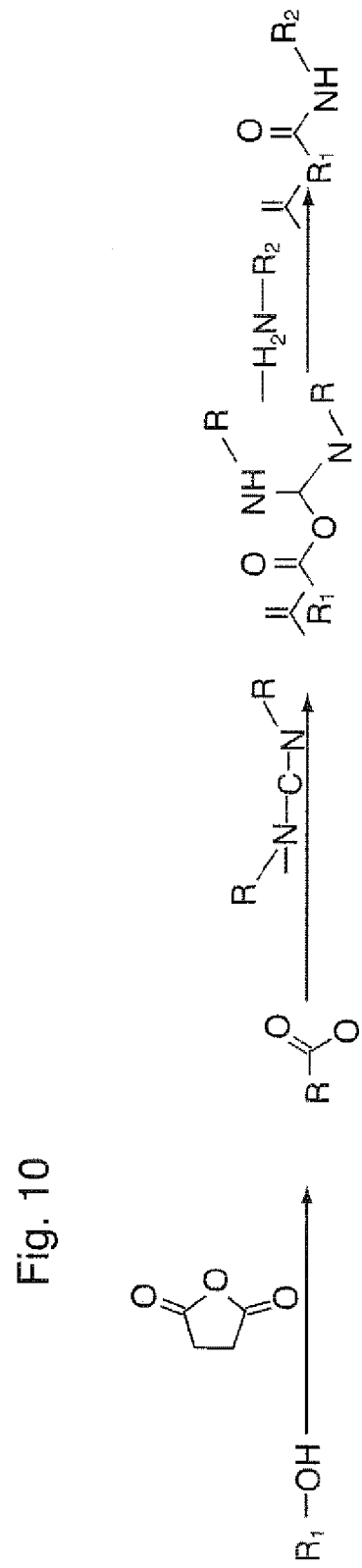
FIG. 10 shows the coupling of PVA with PEI using N,N'-Dicyclohexylcarbodiimide.

The third component of the present composite may comprise a coupling, crosslinking or catalyzing agent to induce a reaction between the first and second components. The third component may include, but is not limited to, mineral acids, carboxylic acids containing 1-4 carbon atoms (steric hindrance), di-carboxylic acids, poly-functional or di-functional aldehydes (e.g. formaldehyde, glutaraldehyde, glyoxal), or combinations thereof. The concentration of the third component may range from about 0.1 wt % to about 30 wt %, from about 5 wt % to about 15 wt %, from about 1.5 wt % to about 10 wt %. The addition of the third component when forming the composite enhances the adhesion of the polyol component to a solid porous support, if a porous solid support is further employed. The third component is a catalyst or a coupling agent that promotes the coupling of active groups in the amine and/or polyol, and does not necessarily get incorporated into the final composite (eg. see composite formed as end product in FIG. 8 which lacks such third component). In a first embodiment, an amine-based sorbent can be prepared by a conventional impregnation process of a pre-prepared active amine composite as described herein or by reacting the three components of the active amine composite on the porous solid support.

Synthesis of the pre-prepared active amine composite may be carried out via a refluxing route of a solution containing amine, any polyol and carboxylic acid components, for example for 5 hours and at 70° C. The active amine composite may then precipitated using a proper mixed solvent process. When the impregnation method is employed, the solid porous support can be impregnated with a solution of the pre-prepared active amine composite preferably utilizing the incipient wetness process. The amine-supported sorbent may then dried by evaporation.

In a further embodiment, the present amine-based sorbent may by synthesized by reacting the active amine component with a second component catalytically inside the pores of the solid support. For example, polyol may be dissolved in a suitable solvent and a solid porous support then impregnated with the prepared polyol solution preferably utilizing the incipient wetness process. The solvent may then removed via, for example, a slow evaporation method to form a thin film of the polyol inside the pores and pore channels of the solid support Amine solution may then be prepared by dissolving the amine in a suitable solvent. For example, where the amine is polyethylene amine (PET), in the branched form PEI is soluble in water or ethanol. In the linear form, PH is soluble in hot water, methanol, ethanol, or chloroform. The supported polyol sorbent may be dispersed in a suitable solvent and maintained dispersed by continuous stirring. The amine solution and supported polyol sorbent are combined, and a suitable amount of a third component added. The reaction mixture can be refluxed, for example, for 5 hours at 70° C. with stirring, or at an appropriate time and temperature. The amine-based sorbent may then filtered, washed several times with a solvent to remove the un-reacted amine and dried, for example, for 5 hours at 105° C. The reaction temperature can be varied based on the amine, polyol and employed solvent boiling points. The selected solvent, such as water, alcohols or chloroform, and preferably water, does not react with either amine or polyol under the reaction conditions.

In a further embodiment, amine based sorbent can be synthesized by forming a layer of cross-linked hydrogel on a porous support material. In an aspect of this embodiment, a solid porous support is impregnated with a solution containing a polyamine and hydrophilic polymer. This may be achieved by, but not limited to, the incipient wetness method. If necessary, solvent in the pores of the support can be removed by slow evaporation, for example at 105° C. for 5 hours. A cross linking agent, containing aldehyde groups, may be dissolved in a suitable solvent. The cross linking agent solution can be combined with the mixed-polymers supported sorbent. For example by stirring for 4 hours. The solid sorbent may be then filtered, washed several times with an appropriate solvent and then dried, for example, for 5 hours at 105° C.

In a further embodiment, hydrophilic polymer contains hydroxyl groups can be coupled with amine groups on the amine and/or polyamine using disuccinimidyl carbonate coupling agent.

In a further embodiment, hydrophilic polymer can be coupled with the amine/polyamine using a coupling agent. For example, hydrophilic polymer, such as polyvinyl alcohol, is reacted with succinic anhydride to attach a carboxylic acid group to the PVA chain. A primary amine group in the (poly) amine may be coupled with the carbonyl group on the PVA chain to produce a PVA-PEI amide linkage using a coupling agent such as, but not limited to, dicyclohexyl carbodiimide.

In a further embodiment, pre-synthesized active amine composite can be utilized for the $CO_2$ absorption in an aqueous solution. For example, pre-synthesized active amine composite can be dissolved in an appropriate solvent e.g. one that does not substantially react with the amine composite.

The present sorbents can be used for removing acidic gases, such as, but are not limited to, $CO_2$ and/or $H_2S$ from gaseous streams. The sorbents are preferably thermally stable over a range of operating temperatures and pressures. Porous solid sorbent can be employed as powder, pellets, extrudates, spheres, monoliths, or other physical forms. Once synthesized, the sorbent may be employed in sorption/desorption cyclic processes using a fixed bed, fluidized bed, or other appropriate reactor.

The present sorbents may be employed via contacting said sorbent with a gaseous stream containing acidic gases and possibly water vapour where the acid gases physically adsorb and/or chemically react with the active amine on the sorbent. The process may be conducted at any suitable temperature such as from ambient to about 100° C. The process may be conducted at any suitable pressure such as up to about 1500 psig.

Once the sorbent has reached capacity, the sorbent is typically be regenerated and the absorbed acidic gas removed. This allows the sorbent to be reused with consequent cost and efficiency advantages.

The desorption of the acidic gas may be conducted in any suitable manner. For example, the desorption can be conducted at an elevated temperature from ambient to about 130° C. or higher using processes such as, but not limited to, pressure swing, gas purge, vacuum, lean gas sweep, temperature swing, liquid sweep, or combinations thereof. Certain of the present sorbents enable acidic gas sorption/desorption cycles at various temperatures and pressures. The sorption/desorption cycles can be performed using different pressure protocols, for example: Desorption pressure equal to Absorption pressure; Desorption pressure less than Absorption pressure; Desorption pressure greater than Absorption pressure FIG. 1 is a schematic depiction of an acid gas stripping process 50 of the present invention, as used in the Examples referred to herein, where the acid gas contained in the fluid stream is carbon dioxide contained in cylinder 1, and where a nitrogen (sweeping gas) supply is provided by cylinder 2 containing $N_2$. A mass flow controller 3, a pressure gauge 4, and a sorbent bed 5 is provided in the fluid stream, wherein the sorbent is prepared in accordance as by the method of the present invention, and comprises:
(i) a first component comprising an amine compound at a concentration of from about 1 wt % to about 75 wt % of the final composite;
(ii) a second component comprising a hydrophilic polymer and/or a pre-polymer compound at a concentration of from about 1 wt % to about 30 wt % of the final composite; and
(iii) a third component which serves as a coupling, cross-linking or catalyzing agent to induce a reaction between the first and second components, at a concentration of from about 0.01 wt % to about 30 wt % of the final composite.
A back pressure regulator 6, a $CO_2$ auto analyzer 7, a gas chromatograph 8, are further provided within the fluid stream used in the Examples referred to herein. A thermocouple 9 was used to determine temperature of the sorbent.

Figure 2:
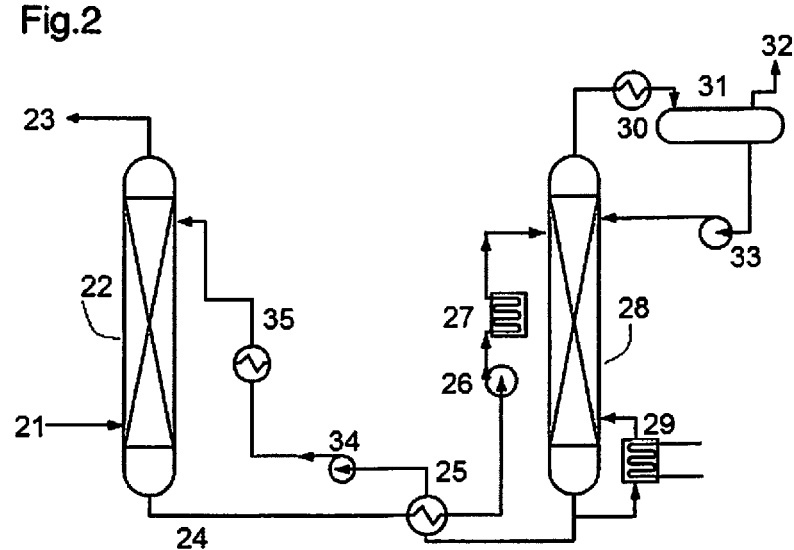
FIG. 2 is a schematic graph of the carbon dioxide absorption using liquid absorbing fluid at atmospheric pressure.

FIG. 2 is a schematic depiction of the carbon dioxide absorption (stripping) process of the present invention using liquid absorbing fluid at atmospheric pressure, where a fluid stream containing $CO_2$ gas 1 is injected into a tubular absorber 2. Treated gas 3, with $CO_2$ at least partly or substantially removed, flows out of tubular absorber 2. Rich solution 4 containing $CO_2$ is passed through heat exchanger 5 using circulating pump 6, and is thereafter passed through boiler 7, into tubular desorption tank 8. Boiler 9 supplies heated and pressurized rich solution 4 to desorption tank 8. Stripped (desorbed) $CO_2$ flows through condenser 10, into drum 11, and thereafter for collection or further usage via outlet 12. Circulating pump 13 circulates a portion of collected $CO_2$ under pressure back to desorption tank 8, to thereby act as the sweep fluid in the desorption step in desorption tank 8. Circulating pump 14 circulates sorbent stripped of all $CO_2$ through heat exchanger 15 back to tubular absorber 2.

Figure 3:
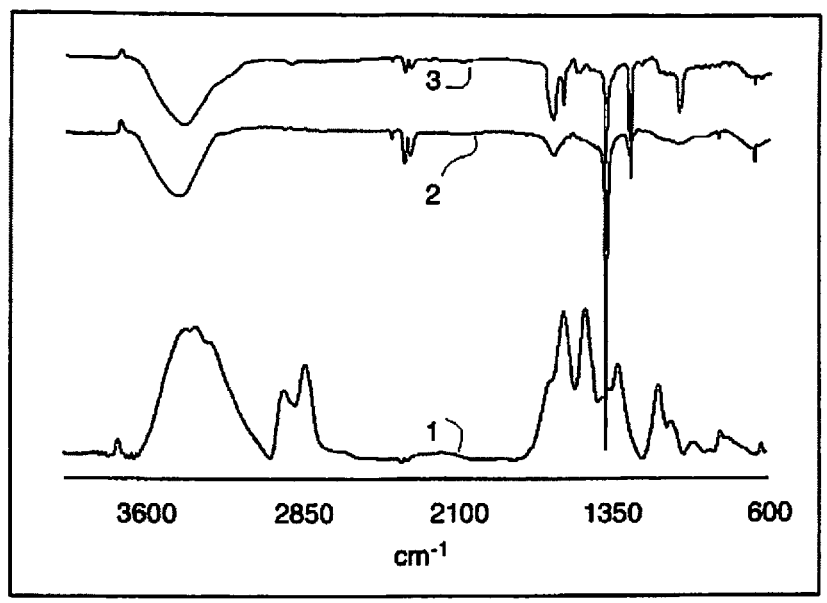
FIG. 3 is the FT-IR spectra of the sorbent described in Example I, PVA and PEI.

FIG. 3 is a graph of the FT-IR spectra of the sorbent described in Example 1 (line 3), polyvinyl alcohol (PVA) (line 2), and polyethylenimine (PEI) (line 3).

Figure 4:
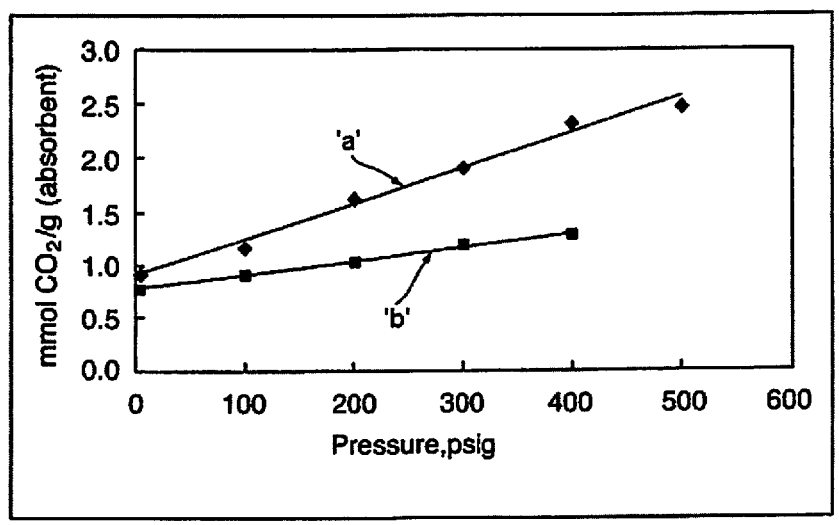
FIG. 4 shows is a $CO_2$ capacity comparison (at different pressures) of the sorbent of Example 3 versus a supported amine-polyol sorbent.

FIG. 4 is a $CO_2$ capacity comparison (at different pressures) of the sorbent described in Example 3 (3.4 wt. % of PVA, 8.9 Wt. % PEI and 87.7 wt. % Aerolyst 3046, line 1) versus a known supported amine-polyol sorbent (line 2).

Figure 5:
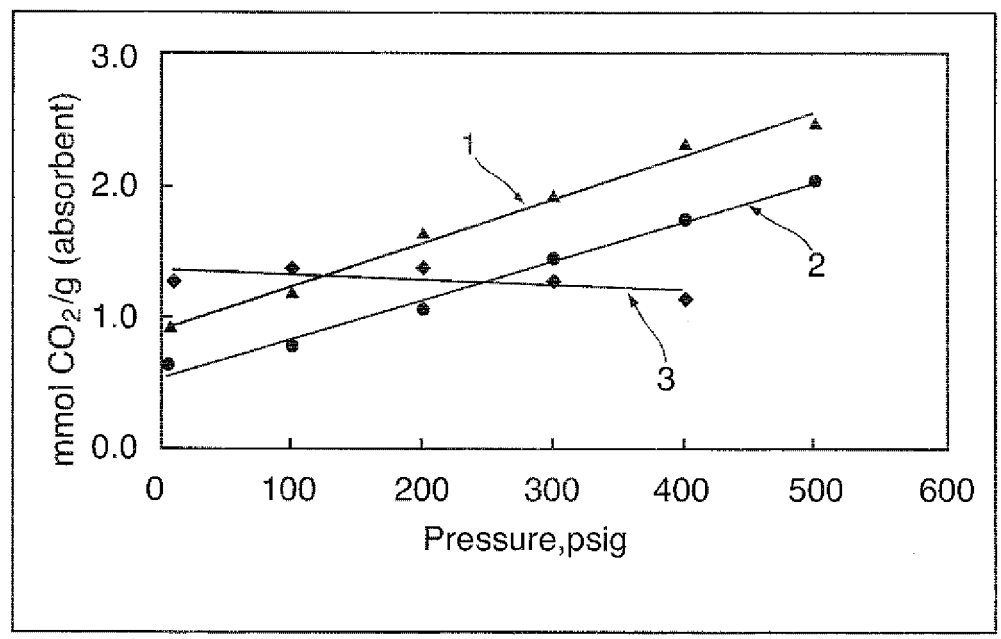
FIG. 5 is a $CO_2$ capacity comparison of the sorbent described in Example 3 versus certain known sorbents.

FIG. 5 is a $CO_2$ capacity comparison of the sorbent described in Example 3, (3 wt. % of PVA, 9.3 Wt. % PEI and 88 wt. % Aerolyst 3046, (line 1) versus a known sorbent comprised of 9.4 wt % PEI and 90.6 wt % Aerolyst 3046 (line 2) and another known sorbent comprised of 33.6 wt % PEI and 66.4 wt % Aerolyst 3046 (line 3).

Figure 6:
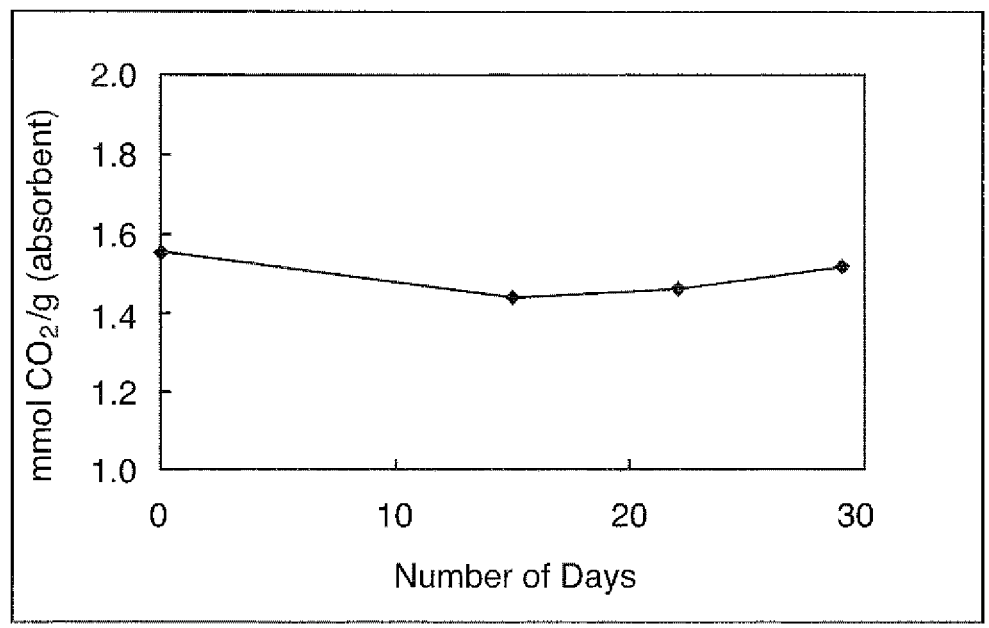
FIG. 6 represents the thermal stability of the sorbent described in Example 3.

FIG. 6 is a graph of CO2 concentration over days, and shows the thermal stability of the sorbent described in Example 3.

Figure 7:
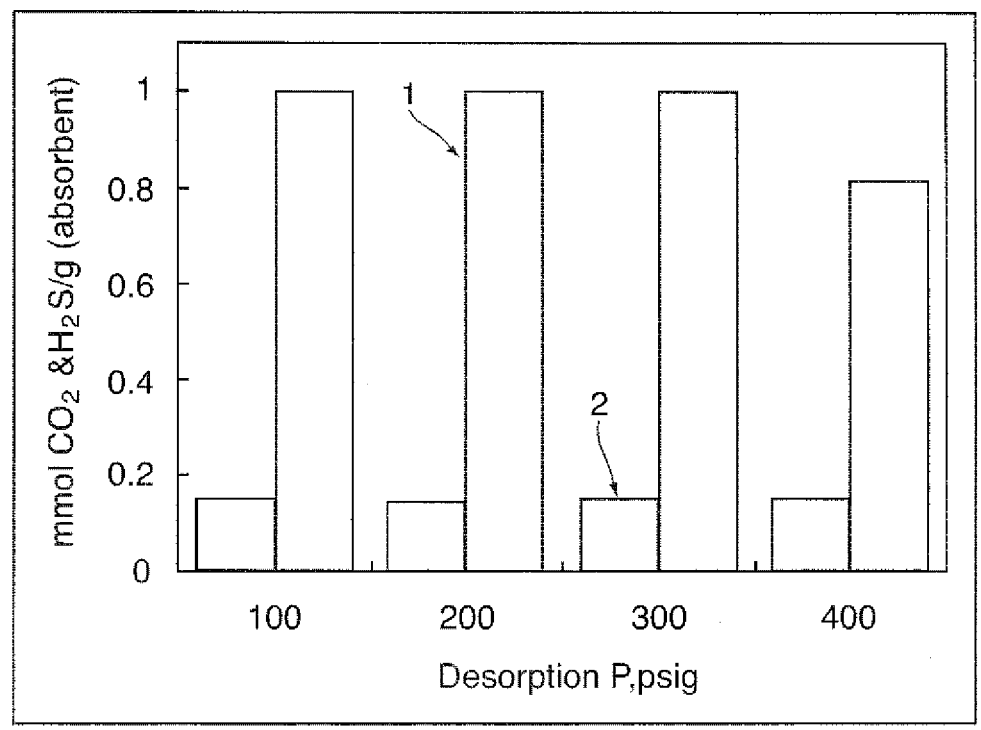
FIG. 7 is a graph illustrating repeated $CO_2$ and $H_2S$ absorption-desorption cycles of Example 2.

FIG. 7 is a graph illustrates repeated $CO_2$ (column 1) and $H_2S$ (column 2) absorption-desorption cycles of Example 2 where the absorption modes were performed at 100 psig, and the desorption mode was performed at different pressures of 100, 200, 300, and 400 psig.

It is contemplated that any embodiment, aspect, example, method, composition, or element discussed in this specification may be implemented or combined in any suitable manner with any other embodiment, aspect, example, method, composition, or element.

Unless defined otherwise, all technical and scientific terms used herein have the same meaning as is commonly understood by one of ordinary skill in the art to which this invention belongs. If a definition set forth in this section is contrary to or otherwise inconsistent with a definition set forth in the patents, applications, published applications and other publications that are herein incorporated by reference, the definition set forth in this section prevails over the definition that is incorporated herein by reference. Citation of references herein is not to be construed nor considered as an admission that such references are prior art to the present invention.

The invention includes all embodiments, modifications and variations substantially as hereinbefore described and with reference to the examples and Figures. It will be apparent to persons skilled in the art that a number of variations and modifications can be made without departing from the scope of the invention as defined in the claims. Examples of such modifications include the substitution of known equivalents for any aspect of the invention in order to achieve the same result in substantially the same way.

Embodiments of the invention are illustrated, in part, by the following non-limiting methods and examples.

EXAMPLE 1

Active Components Coupled in Solution, then Dispersed in a Support

The following example illustrates the synthesis of a polyethylenimine-polyol sorbent composed of 13.9 wt % polyethylenimine, 24.6 wt % polyvinyl alcohol, 1.3 wt % acetate, 3.2 wt % $H_2O$ and 57 wt % porous support.

Synthesis of the Active Amine Composite

Approximately 5 g of polyvinyl alcohol (99% hydrolyzed, MW=85000-124000), Aldrich) was dissolved in 35 ml of distilled water at a temperature of 90° C. for 3 hours. To the polyvinyl alcohol solution, 10 g of polyethylenimine solution (Polyethylenimine, 50% solution in water, Mn=1200, Mw 1300, Aldrich) was added drop-wise while stirring. Subsequently, a small amount of glacial acetic acid (0.45 g) was added to the mixture. The PEI-PVA mixture was stirred and refluxed at 70° C. for 5 hours. The reaction mixture was then cooled down to 50° C. and solid PEI-PVA product was precipitated utilizing 50 ml of mixed acetone/water solution containing 10% of acetone. The sticky PEI-PVA product was then filtered and washed several times with the mixed solvent to remove the un-reacted PEI. The white PEI-PVA solid product was dried at 50° C. and –65 kPa for 6 hours. The weight of the white plastic-like product was 8.37 and its density was 0.5170 g/ml.

In this Example 1 the addition of the acetic acid has twofold functionality. First, the acetate group enhances the adsorption of the PVA on the silica surface (as per Malgorzata Wisniewska, Colloid Polym Sci 289:341-344 (2011)). Second, the acid induces the complexation between the hydroxyl group of the PVA and cationic group of the PEI forming ionically cross linked PVA-PEI composite. Furthermore, the acid catalyzed reaction of the PVA with PEI may also result in eliminating a water molecule and producing PVA-PEI composite illustrated in FIG. 8.

The active amine composite was analyzed using FT-IR spectroscopy for the presence of the PEI and acetate group, FIG. 2. The two additional peaks appeared at 1261 and 1587 can be attributed to the $NH_3^+$ deformation (see P. Srinivasa Rao, Separation and Purification Technology 48:244-254 (2006) and U.S. Pat. No. 7,863,258). In addition, the elemental analysis of the precipitated active amine composite (C=50.72 wt %, $N_2$=10.24 wt %, $H_2$=8.91 wt %, and O=30.13) was in a good agreement with the calculated values (C=50.95 wt %, $N_2$=9.81 wt %, $H_2$=9.96 wt %, and O=29.28 wt %). From the elemental analysis, the active amine composite contains PEI=32.18%, PVA=57.14, $CH_3$—$COO^-$=3.07, H2O=7.61%. From the above the cross-linked nature and chemical composition of the adduct can be inferred.

Synthesis of the Sorbent

The silica support (Aerolyst 3038) was ground and utilized to synthesize a supported PEI-PVA sorbent composed of 43 wt. % of PEI-PVA composite (24.6 wt. % PVA, 13.9 wt. % PEI, 1.3% Acetate and 3.2 wt % $H_2O$) and 57 wt. % Aerolyst 3038.

3.4 g of the synthesized PEI-PVA composite was dissolved in 14.5 ml of distilled water. Approximately 4.5 g of Aerolyst 3038 support was impregnated with the obtained PEI-PVA viscous solution utilizing the incipient wetness process. Subsequently, the sorbent was dried at 105° C. for 5 hours. The supported PEI-PVA sorbent was then crushed to form the powder sorbent.

EXAMPLE 2

Active Components Dispersed in a Support and then Coupled

This example describes the preparation of a supported PEI-PVA sorbent composed of 3 wt. % PVA, 11 wt. % PEI and 86 wt. % Aerolyst 3038.

Aerolyst 3038 support was ground and dried at 105° C. for 2 hours before use. 13.62 g of the dry Aerolyst support was impregnated with 22.1 ml of aqueous solution that contained 2.5 wt. % PVA (0.55 g PVA) using the incipient wetness process. The supported PVA sorbent was dried at 105° C. for 5 hours. Approximately 5.51 g of the synthesized supported PVA sorbent was then refluxed for 5 hours at 70° C. with 0.75 g of glacial acetic acid and 83.5 ml of 10 wt. % PEI solution while stirring. The PEI/PVA/Aerolyst 3038 sorbent was cooled to room temperature, filtered and then dried at 105° C. for 5 hours. The synthesized sorbent was ground before use.

EXAMPLE 3

Example 3 is similar to Example 2 except the silica support was Aerolyst 3046. The surface characteristics of the silica support are given in Table (1). The sorbent was composed of 3.4 wt. % of PVA, 8.9 Wt. % PEI and 87.7 wt. % Aerolyst 3046.

EXAMPLE 4

Example 4 is similar to Example 3 except MEA was employed. The sorbent was composed of 3.4 wt. % PVA, 5.5 wt. % MEA and 91.1 wt. % Aerolyst 3046.

EXAMPLE 5

This Example describes the preparation of a supported cross-linked PEI-PVA sorbent composed of 7.5 wt. % PVA, 7.5 wt. % PEI, 10 wt % aldehyde and 75 wt. % mesoporous silica support (SBA-15).

Synthesis of the Mesoporous Silica Support

The mesoporous silica support was synthesized similarly to reported procedures (see US 2007/0149398 and D. Zhao, Q. HuO, J. Feng, B. F. Chmelka, G. D. Stucky, J. Am. Chem, Soc. 120:6024, 1998).

Preparation of the Sorbent 10 g of 2.5 wt % PVA aqueous solution was mixed with 10 g of 2.5 wt % of PEI aqueous solution and stirred for a few minutes to produce a homogenous solution. Approximately 2.5 g of SBA-15 silica support was impregnated with PEI-PVA homogenous mixture employing the incipient wetness method. The supported PEI-PVA sorbent was then dried at 105° C. for 10 hours in a convection oven. 2.5 g of glyoxal (40% wt % in water) was mixed with 37.5 g of acetone. Subsequently, the dry supported PEI-PVA sorbent was dispersed in the prepared 2.5 wt % glyoxal solution. The mixture was stirred for 4 hours at room temperature to form a cross-linked PEI-PVA thin film inside the mesopores of the silica support. The sorbent was filtered and washed several times with acetone and then dried at 105° C. for 5 hours.

EXAMPLE 6

This Example concerns the measurement of the acidic gas absorption capacity using a fixed bed flow system.

$CO_2$ and/or $H_2S$ capacity were obtained by a down-flow tubular absorber. The system comprised, as shown in FIG. 1, a gas feeding section, a down-flow pressure absorber, heating elements with a temperature controller for controlling the regeneration temperature and a $CO_2$ auto analyzer and/or gas chromatograph.

In a typical run, a few grams of the sorbent particles under investigation were enclosed between two glass wool zones. Feed and sweep gas flows were controlled by a mass flow controller, and the pressure of the tubular absorber was controlled via a back pressure control valve placed on the outlet gas stream. The breakthrough time of the acidic gas was determined by a $CO_2$ auto-analyzer and/or micro gas chromatograph equipped with an automated stream selection valve. The absorber was pretreated with a $N_2$ gas stream with a flow of 10 cc/min and a temperature of 130° C. for 2 hours. The acidic gas absorption modes were performed at room temperature and different pressures, while desorption modes were conducted at a constant temperature of 130° C. and different pressures using $N_2$ or $CO_2$ gas. The $CO_2$ and $H_2S$ desorption time was varied based on the sweep gas flow. Table 2 shows the absorption measurements of some sorbents. FIG. 4, line 1 refers to the sorbent according to Example 3 and line 2 refers to a known amine sorbent comprising 11 wt % polyethyleneimine and 16 wt % polyethylene glycol and 73 wt % Aerolyst 3046 (U.S. Pat. No. 5,376,614, Birbara). In FIG. 3, each absorption/desorption cycle was conducted at a pressure of 10, 100, 200, 300, 400 and 500 psig, respectively. From FIG. 3, it can be seen that at a pressure of 400 psig and ambient temperature, the $CO_2$ capacity of the present invention was 77.7% higher than the comparator sorbent.

FIG. 5, line 1 refers to the sorbent according to Example 3, line 2 refers to a known sorbent (see, X. Xu et al, Microporous Mesoporous Mater, 62:29, 2003) comprised of 9.4 wt % PEI and 90.6 wt % Aerolyst 3046, and line 3 refers to a known sorbent comprised of 33.6 wt % PEI and 66.4 wt % Aerolyst 3046. From FIG. 5, the $CO_2$ absorption capacity of the sorbent according to Example 3 was 21.5% higher at a pressure of 500 psig than that obtained for a known sorbent composed the same amount of PEI and Aerolyst 3046 support. However, the $CO_2$ absorption capacity of the known sorbent comprised of a high amount of PEI (33.6 wt %) remained fairly constant but still less than that obtained from Example 3 at absorption pressures ranging from 10 psig to 400 psig.

EXAMPLE 7

The sorbent of Example 3 was subjected to a thermal stability test. The tubular absorber was charged with 4.4 g of the sorbent described in Example 3, and the pressure of the tubular absorber was then increased to 400 psig employing a $CO_2/N_2$ gas mixture containing 22.4% $CO_2$. The temperature of the tubular absorber was increased to 130° C. After two weeks, the tubular absorber flushed with $N_2$ gas at 400 psig to remove the $CO_2$ from the tubular absorber, cooled down to room temperature, and the absorption mode was then repeated at the same pressure. Subsequently, the temperature of the tubular absorber was increased to 130° C. and the absorption mode was repeated after 21 and 30 days. FIG. 6 shows the $CO_2$ absorption capacity for several cycles. From FIG. 6, the sorbents are seen to have high thermal stability and are capable of repeated absorption/desorption cycles without diminished absorption capacity.

EXAMPLE 8

This example describes the $CO_2$ and $H_2S$ desorption at a pressure higher than the absorption pressure.

The sorbent according to Example 2 was put through absorption/desorption cycles where the absorption modes were performed at a constant pressure of 100 psig and the desorption modes were performed using a flow of $N_2$ gas at a temperature of 130° C. and pressures of 100, 200, 300, 400 psig, respectively. FIG. 7 shows that the $CO_2$ absorption capacity was constant at pressures up to 300 psi, and diminished slightly at 400 psi, while $H_2S$ absorption capacity was fairly constant over the pressure range. This demonstrates that the sorbents are capable of high-pressure desorption, even when absorption occurred at low pressure, which enables substantial savings in compression energy when recovering acid gases like $CO_2$ and $H_2S$ for high-pressure uses, such as disposal by injection into subterranean formations or for pipelining.

EXAMPLE 9

This example demonstrates the utilization of the amine composite in aqueous solution. In this Example the active amine composite was synthesized as described in Example 2 and the absorbing fluid was manufactured by dissolving 50 g of the synthesized active amine composite in 450 g of water at 90° C. and stirring until homogenous. The concentration of the active amine composite in the manufactured absorbent was 10 wt % of the final absorbent. In order to increase the $CO_2$ absorption capacity of the absorbing fluid according to this Example, attempts were made to manufacture aqueous solutions comprising higher concentrations of the active amine composite than 10 wt % of the final absorbent. However, the viscosity of the aqueous absorbing fluid increased and the volumetric flow of the feed stream decreased significantly.

EXAMPLE 10

In this Example the active amine composite was synthesized as described in Example 2, except that the molecular weight of the utilized polyvinyl alcohol was lower than the molecular weight of the polyvinyl alcohol employed in Example 2 and was in the range of from 13000 to 23000 AMU. Therefore, the synthesized active amine composite according to this example was of a lower molecular weight than the active amine composite according to Example 2. Accordingly, aqueous solutions comprising higher concentrations of the active amine composite than 10 wt % of the final absorbent can be manufactured. The absorbing fluid was manufactured by dissolving 75 g of the active amine composite synthesized according to this Example in 425 g of water at 90° C. and stirring until homogeneous. The concentration of the active amine composite in the manufactured sorbent was 15 wt % of the final sorbent.

EXAMPLE 11

This Example concerns measurement of the acidic gas absorption capacity of the active amine composite solutions.

FIG. 2 is a schematic of the acidic gas absorption apparatus. The apparatus comprises a gas and liquid feeding sections, a tubular absorber, a liquid trap, a back pressure control valve and a $CO_2$ auto-analyzer.

A glass tubular absorber of 1 cm internal diameter and 59.5 cm length was employed to measure the $CO_2$ capacity of the active amine composite solutions at atmospheric pressure, while a stainless steel tubular absorber was utilized to measure the $CO_2$ capacity at pressures higher than atmospheric pressure. The glass absorber was packed with glass beads to provide a proper contact between the $CO_2$ containing gas stream and active amine composite solution. The active amine composite solution and $CO_2$ containing gas stream were supplied to the glass tubular absorber via an HPLC pump and a mass flow controller, respectively. The active amine composite solutions were fed to the absorber from top to bottom, while the $CO_2$ containing gas or desorption sweep gas ($N_2$) was fed to the absorber from bottom to top. The absorption modes were conducted at atmospheric pressure and ambient temperature, while desorption modes were performed at 90° C. using a flow of $N_2$ gas as a sweep gas. Table 3 shows the $CO_2$ absorption capacity of the active amine composite solutions according to Example 9 and Example 10 at atmospheric pressure. From Table 3, the $CO_2$ capacity of the sorbent according to Example 10 increased 36.3% compared with that calculated for the absorbing fluid according to Example 9.

A thick-walled 316 stainless steel tube of 1.41 cm internal diameter and 59.5 cm length was utilized for measuring the $CO_2$ capacity at pressures higher than the atmospheric pressure. The stainless steel tubular absorber was charged with 50 gm of the active amine composite solution according to Example 9 and the $CO_2$-containing gas stream was supplied to the stainless tubular absorber from bottom to top by a mass flow controller. The $CO_2$ absorption modes were conducted at ambient temperature and pressures of 100 and 500 psig, respectively. The $CO_2$ desorption modes were performed at a temperature of 90° C. and at pressures similar to the absorption pressures. The $CO_2$ capacity was measure at ambient temperature and a pressure of 100 and 500 psig. Table 4 shows the $CO_2$ absorption capacity of the active amine composite solution according to Example 9 at different pressures. The $CO_2$ capacity of the active amine composite solution increased with increasing the pressure.

Selection of Stripping (Ie Desorption Sweep) Gas

Although nitrogen was used as the stripping gas (ie desorption sweep gas) in the above Examples and as shown in FIG. 1, other gases can be utilized. For example, if the acid gas being stripped from a fluid stream (containing hydrocarbons from a hydrocarbon-containing formation) is $CO_2$, and which $CO_2$ is desired to be utilized (or re-used) for re-injection into a hydrocarbon-containing formation for diluent purposes and thereby enhanced recovery of oil from within the hydrocarbon-containing formation, it would be desirable to maintain the concentration of $CO_2$ in the stripping (ie desorption sweep) gas as high as possible: In this case hot $CO_2$ can be selected as the stripping gas so there will be no dilution of the $CO_2$. This approach was adopted in the process/system shown in FIG. 2 herein.

TABLE 1

Physical characteristics of the silica support

| Support | Aerolyst 3038 | Aerolyst 3046 |
|---|---|---|
| Basic compound | Aerosil 380 | Aerosil 380 |
| Shape | Extrudates | Rings |
| Diameter, mm | 2.5 | OD 4.7, ID 2.0 |
| Surface area, $m^2/g$ | 270 | 180 |
| Pore volume, ml/g | 0.9–1.0 | 0.8–0.9 |
| Tapped density, g/l | 400–460 | 340–400 |
| Si content | 99.8 | 99.8 |

TABLE 2

$CO_2$ absorption capacity of some of the solid sorbents

| Absorption P, psig | 10 | 100 | 200 | 300 | 400 | 500 | Ex. # |
|---|---|---|---|---|---|---|---|
| Feed gas flow, cc/min | 17.65 | 17.65 | 17.65 | 17.65 | 17.65 | 17.65 | 1 |
| CO2 Conc. % | 21.14 | 21.14 | 21.14 | 21.14 | 21.14 | 21.14 | |
| $CO_2$ mmol/g Absorbent | 0.42 | 0.73 | 0.89 | 1.06 | 1.38 | 0.42 | |
| Feed gas flow, cc/min | 14.1 | 13.1 | 10.7 | 10.7 | 10.7 | 13.0 | 2 |
| $CO_2$ Conc. % | 10.79 | 10.79 | 11.84 | 11.84 | 11.84 | 11.84 | |
| $CO_2$ mmol/g Absorbent | 0.815 | 0.974 | 1.275 | 1.491 | 1.554 | 1.792 | |
| Feed gas flow, cc/min | 17.65 | 17.65 | 17.65 | 17.65 | 17.65 | 17.65 | 4 |
| $CO_2$ Conc. % | 24.4 | 24.4 | 24.4 | 24.4 | 24.4 | 24.4 | |
| $CO_2$ mmol/g Absorbent | 0.51 | 0.94 | 1.20 | 1.38 | 1.77 | 2.30 | |
| Feed gas flow, cc/min | 18.18 | 18.18 | 18.18 | 17.65 | 17.65 | 17.65 | 5 |
| $CO_2$ Conc. % | 24.4 | 24.4 | 24.4 | 24.4 | 24.4 | 24.4 | |
| $CO_2$ mmol/g Absorbent | 0.309 | 0.965 | 1.639 | 2.316 | 2.957 | 3.562 | |

TABLE 3

$CO_2$ absorption capacity of the absorbing fluids at atmospheric pressure

| | Example 9 | Example 10 |
|---|---|---|
| Mass of the absorbent | 150 | 100 |
| Active amine composite, wt % | 10 | 15 |
| Sorbent flow rate, ml/min | 0.3 | 0.3 |
| Feed gas flow, cc/min | 6.19 | 6.19 |
| $CO_2$ Conc. % | 6.5 | 16.75 |
| $CO_2$ mmol/gm of absorbing fluid | 0.067 | 0.091 |

TABLE 4

$CO_2$ absorption capacity of the absorbing fluid according to Example 9 at different pressures

| Absorption P, psig | 100 | 500 |
|---|---|---|
| Mass of the absorbent, gm | 50 | 50 |
| Active amine composite, wt % | 10 | 10 |
| Feed gas flow, cc/min | 10.71 | 10.71 |
| CO2 Conc. % | 19.66 | 19.66 |
| $CO_2$ mmol/gm of absorbing fluid | 0.067 | 0.179 |

The scope of the claims should not be limited by the preferred embodiments set forth in the foregoing examples, but should be given the broadest interpretation consistent with the description as a whole, and the claims are not to be limited to the preferred or exemplified embodiments of the invention.

The invention claimed is:

1. An acid-gas sorbent comprising an amine composite, said composite comprising:
   (i) a first component comprising an amine compound at a concentration of from about 1 wt % to about 75 wt % of the final composite;
   (ii) a second component comprising a hydrophilic polymer and/or a pre-polymer compound at a concentration of from about 1 wt % to about 30 wt % of the final composite; and
   (iii) a third component which serves as a coupling, cross-linking or catalyzing agent to induce a reaction between the first and second components, at a concentration of from about 0.01 wt % to about 30 wt % of the final composite.

2. The acid-gas sorbent as claimed in claim 1, wherein the first and second component become chemically bonded.

3. The acid-gas sorbent as claimed in claim 1, further comprising, or impregnated within, a porous support.

4. The acid-gas sorbent as claimed in claim 2, further comprising, or impregnated within, a porous support.

5. The acid-gas sorbent as claimed in claim 3 or 4 wherein the porous support is a solid porous support, and said support is of a material selected from the group of solid porous support materials consisting of silica, alumina, silica-alumina, zeolite, carbon, precipitated oxides, ceria, titania, and a combination thereof.

6. The acid-gas sorbent as claimed in claim 3 or 4 wherein the porous support has a pore diameter, and said pore diameter is from about 1 nm to about 50 nm.

7. The acid-gas sorbent as claimed in any one of claims 2 or 3, wherein the surface area of the porous support is from about 10 to about 2000 $m^2/g$.

8. The acid-gas sorbent as claimed in any one of claim 1, 2 or 3, wherein the amine is a primary, secondary, or tertiary alkylamine, aromatic amine, polyamine, or a combination thereof.

9. The acid-gas sorbent as claimed in any one of claim 1, 2 or 3, wherein the amine is a linear, branched, or hyperbranched polyethyleneimine of a molecular weight 600 AMU or greater.

10. The acid-gas sorbent as claimed in any one of claim 1, 2 or 3, wherein the amine is an amine selected from the group consisting of amines consisting of monoethanol amine (MEA), diethanolamine (DEA), methyldiethanol amine, triethanolamine, tetraethylenepentaamine, cyclic amines, pre-hyperbranched amine polymer, polyethyleneimine, amine-grafted polyvinyl alcohol, amine-containing polyethylene glycol or polyaminoethyl methacrylate, and a combination thereof.

11. The acid-gas sorbent as claimed in any one of claim 1, 2 or 3, wherein the hydrophilic polymer or pre-polymer component is selected from carbohydrates, ethylene glycol, polyvinyl alcohol, polyethylene glycol, and combinations thereof.

12. The acid-gas sorbent as claimed in any one of claim 1, 2 or 3, wherein the third component is a carboxylic acid selected from those containing one to four carbon atoms.

13. The acid-gas sorbent as claimed in any one of claim 1, 2 or 3, wherein the third component is a cross-linking agent selected from the group of cross-linking agents consisting of aldehydes, glutarldehyde, glyoxal, and combinations thereof.

14. The acid-gas sorbent as claimed in any one of claim 1, 2 or 3, wherein the third component is a coupling agent selected from the group of coupling agents consisting of 1,1'-carbonyldiimidazole, N,N'-dicyclohexylcabodiimide, and a combination thereof.

15. The acid-gas sorbent as claimed in any one of claim 1, 2 or 3, wherein the first component and the second component are cross-linked by a dehydration chemical reaction.

16. The acid-gas sorbent as claimed in any one of claim 1, 2 or 3, wherein the first component and the second component are cross-linked via a chemical reaction with the cross linking agent.

17. The acid-gas sorbent as claimed in any one of claim 1, 2 or 3, wherein the sorbent further comprises a polyol.

18. The acid-gas sorbent as claimed in any one of claim 1, 2 or 3, wherein the sorbent further comprises a polyol that is reactive with the amine composite.

19. The acid-gas sorbent as claimed in any one of claim 1, 2 or 3, wherein the sorbent further comprises a polyol selected from the group of polyols consisting of ethylene glycol, polyethylene glycol, polyvinyl acetate, polyvinyl alcohol, and combinations thereof.

20. The acid-gas sorbent as claimed in any one of claim 1, 2 or 3, wherein the amine composite is formed in solution.

21. The acid-gas sorbent as claimed in any one of claim 1, 2 or 3, further having a porous support, wherein the amine composite is formed in solution and thereafter dispersed within the porous support.

22. Use of an acid-gas sorbent as claimed in any one of claim 1, 2 or 3, further having a porous support, wherein the composite is formed with the pores of the porous support.

23. Use of an acid-gas sorbent as claimed in claim 1, 2 or 3, for the absorption and/or adsorption of an acid gas.

24. Use of an acid-gas sorbent as claimed in claim 1, 2 or 3, for the absorption and/or adsorption of an acid gas, wherein said acid gas is $CO_2$ or $H_2S$.

25. A method of removing an acid gas from a fluid stream containing the acid gas, the method comprising:
   a) providing an incoming fluid stream comprising the acid gas; and
   b) bringing the fluid stream into contact with a sorbent according to any one of claims 1, 2 or 3, under conditions suitable for absorption and/or adsorption of the acid gas by the sorbent;
   wherein the fluid stream comprises a lower amount of the acid gas after contacting the sorbent.

26. The method of claim 25 wherein the acid gas absorption/adsorption step is conducted at a temperature of up to about 100° C.

27. The method of claim 25 wherein the acid gas absorption/adsorption step is conducted at a pressure between vacuum pressures up to about 1500 psig.

28. The method of claim 25 wherein the method further comprises a subsequent desorption step where acid gas is desorbed from the sorbent.

29. The method of claim 25 wherein the method further comprises a desorption step, the desorption step being conducted at a temperature of about 100° C. or higher.

30. The method of claim 25 wherein the method further comprises a desorption step, the desorption step being conducted at a temperature of about 100° C. to about 150° C.

31. The method of claim 25 wherein the method further comprises a desorption step, the desorption step being conducted at a pressure between vacuum pressures up to about 1500 psig.

32. The method of claim 31, wherein the acid gas absorption step is conducted at a pressure higher than the acid gas desorption step.

33. The method of claim 31, wherein the acid gas absorption step is conducted at a pressure substantially equal to the pressure of the acid gas desorption step.

34. The method of claim 31, wherein the acid gas absorption step is conducted at a pressure lower than the acid gas desorption step.

35. A method of preparing an acid-gas sorbent, comprising the steps of combining:
   (i) a first component comprising an amine compound at a concentration of from about 1 wt % to about 75 wt % of the final composite;
   (ii) a second component comprising a hydrophilic polymer and/or a pre-polymer compound at a concentration of from about 1 wt % to about 30 wt % of the final composite; and
   (iii) a third component which serves as a coupling, cross-linking or catalyzing agent to induce a reaction between the first and second components, at a concentration of from about 0.01 wt % to about 30 wt % of the final composite.

36. A method of removing an acid gas from a fluid stream containing the acid gas, the method comprising:
   a) providing an incoming fluid stream comprising the acid gas;
   b) exposing an adduct formed from the combination of:
      i) a first component comprising an amine compound at a concentration of from about 1 wt % to about 75 wt % of the final composite;
      (ii) a second component comprising a hydrophilic polymer and/or a pre-polymer compound at a concentration of from about 1 wt % to about 30 wt % of the final composite; and
      (iii) a third component which serves as a coupling, crosslinking or catalyzing agent to induce a reaction between the first and second components, at a concentration of from about 0.01 wt % to about 30 wt % of the final composite;
   to said incoming fluid stream, under conditions suitable for absorption and/or adsorption of the acid gas by the adduct;
   wherein the fluid stream comprises a lower amount of the acid gas after contacting the adduct.

37. The method as claimed in claim 36 wherein said second component is a polyol, and said third component is a cross-linking agent.

38. The method as claimed in claim 37, wherein said adduct is dispersed in said fluid stream.

39. The method as claimed in claim 38, wherein water is first added to said adduct prior to dispersing said adduct and said water in the incoming fluid stream.

40. The method as claimed in claim 39, wherein said adduct is provided on, or formed within, a solid porous support, and said fluid stream is passed through said solid porous support.

41. The method as claimed in claim 40, wherein said second component is a polyol dissolved in a solvent which solvent does not react with said amine composite, and said adduct is provided in solution into pores within a solid porous support, and allowing said solvent to evaporate leaving said adduct in a thin film in said pores of said solid porous support, and thereafter passing the fluid stream through the solid support under conditions suitable for absorption and/or adsorption of the acid gas by the adduct.

42. The method as claimed in claim 41, wherein the fluid stream is a hydrocarbon-containing fluid stream recovered from an underground formation containing the acid gas carbon dioxide, and wherein it is desired to recover such carbon dioxide from such fluid stream and re-inject said carbon dioxide into said underground formation, further comprising the subsequent step, after step b) of:
  c) exposing said adduct to a pressurized and heated stream of carbon dioxide, to force carbon dioxide within said adduct to be released into said pressurized and heated stream.

* * * * *